(12) United States Patent
Kumar et al.

(10) Patent No.: US 10,198,589 B2
(45) Date of Patent: Feb. 5, 2019

(54) SECURE DISTRIBUTED BACKUP FOR PERSONAL DEVICE AND CLOUD DATA

(71) Applicant: McAfee, LLC, Santa Clara, CA (US)

(72) Inventors: Mitesh Kumar, Bangalore (IN); Srikanth Nalluri, Bangalore (IN); Dattatraya Kulkarni, Bangalore (IN); Kamlesh Halder, Bangalore (IN); Kranthikumar Gadde, Bangalore (IN); Kaushal Kumar Dhruw, Bilaspur Chhattisgarh (IN); Krishnapur Venkatasubrahmanyam, Bangalore (IN); Susmita Nayak, Fremon, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/757,701

(22) Filed: Dec. 23, 2015

(65) Prior Publication Data
US 2016/0196218 A1  Jul. 7, 2016

(30) Foreign Application Priority Data
Jan. 3, 2015  (IN) .............................. 19/DEL/2015

(51) Int. Cl.
*G06F 21/62* (2013.01)
*G06F 11/14* (2006.01)
*H04L 9/08* (2006.01)

(52) U.S. Cl.
CPC ...... *G06F 21/6218* (2013.01); *G06F 11/1448* (2013.01); *G06F 11/1464* (2013.01);
(Continued)

(58) Field of Classification Search
None
See application file for complete search history.

(56) References Cited

U.S. PATENT DOCUMENTS 8,082,325 B2  12/2011  Yano et al.
2004/0003272 A1  1/2004  Bantz et al.
(Continued)

FOREIGN PATENT DOCUMENTS

EP  1278113 A2  1/2003
JP  2003244598 A  8/2003
(Continued)

OTHER PUBLICATIONS

Korean Intellectual Property Office, "Office Action," issued in connection with application No. 2016-7036626, dated Feb. 7, 2018, 16 pages.
(Continued)

*Primary Examiner* — Henry Tsang
(74) *Attorney, Agent, or Firm* — Hanley Flight & Zimmerman, LLC

(57) ABSTRACT

Securely distributing a backup file includes identifying a file to be stored, generating a plurality of file chunks from the file, transmitting from a first device, each of the plurality of file chunks to one of a plurality of storage locations, and generating, at the first device, a map that identifies the storage location for each chunk. Retrieving a distributed backup file includes receiving a request to retrieve a file, obtaining a map corresponding to the file, wherein the map identifies a storage location for each of a plurality of file chunks of the file, retrieving the plurality of file chunks from the identified locations, and generating the requested file by combining the plurality of file chunks.

15 Claims, 9 Drawing Sheets

(52) U.S. Cl.
CPC ............ *H04L 9/085* (2013.01); *H04L 9/0877* (2013.01); *G06F 11/1456* (2013.01); *G06F 2221/2107* (2013.01)

(56) References Cited

U.S. PATENT DOCUMENTS

| | | | |
|---|---|---|---|
| 2004/0049700 A1 | 3/2004 | Yoshida | |
| 2005/0240749 A1* | 10/2005 | Clemo | G06F 3/062 711/170 |
| 2008/0126357 A1 | 5/2008 | Casanova et al. | |
| 2010/0318759 A1 | 12/2010 | Hamilton et al. | |
| 2011/0154015 A1 | 6/2011 | Rahman et al. | |
| 2011/0173676 A1* | 7/2011 | Peckover | G06F 21/6245 726/3 |
| 2012/0300931 A1* | 11/2012 | Ollikainen | G06F 21/6272 380/262 |
| 2013/0101113 A1 | 4/2013 | Cannon et al. | |
| 2014/0281513 A1* | 9/2014 | Kitze | H04L 9/0897 713/165 |
| 2015/0154418 A1* | 6/2015 | Redberg | G06F 17/30106 713/165 |

FOREIGN PATENT DOCUMENTS

| | | |
|---|---|---|
| JP | 2004-147218 | 5/2004 |
| JP | 2005-182691 | 7/2005 |
| JP | 2006012192 A | 1/2006 |
| JP | 2006-350829 | 12/2006 |
| JP | 2007102672 A * | 4/2007 |
| JP | 2010231404 A | 10/2010 |

OTHER PUBLICATIONS

Japanese Patent Office, "Notification of Reasons for Refusal," issued in connection with Japanese Patent Application No. 2016-571130, dated Jan. 5, 2018, 7 pages.
Japanese Patent Office, "Notification of Reasons for Refusal," issued in connection with Japanese Patent Application No. 2016-571130, dated Apr. 18, 2018, 9 pages.
International Searching Authority, "International Search Report and Written Opinion," issued in connection with International Application No. PCT/IB2016/000228 dated Aug. 16, 2016, 16 pages.
International Bureau, "International Preliminary Report on Patentability," issued in connection with International Application No. PCT/IB2016/000228 dated Jul. 13, 2017, 13 pages.
European Patent Office, "Extended European Search Report," issued in connection with European Patent Application No. 16737128, dated Aug. 10, 2018, 7 pages.

* cited by examiner

SECURE DISTRIBUTED BACKUP FOR PERSONAL DEVICE AND CLOUD DATA

TECHNICAL FIELD

Embodiments described herein generally relate to secure distributed backup for personal device and cloud data, and more particularly to a mechanism for backing up personal cloud data residing on any device or service, using any user device while providing the user full control over the encryption of the data.

BACKGROUND ART

A personal cloud is a user's data footprint across a multitude of devices, such as phones tablets, or PCs, and cloud services, such as Dropbox, social networks, Google Drive, SkyDrive, etc. There are many variants of backup solutions, from universal serial bus (USB) drives to cloud storage services. However, these solutions have some drawbacks. For example, regarding cloud storage, each storage service provides a separate app that needs to be installed and set up on each of the devices. If a user deletes a file from a cloud service, the file cannot be recovered unless user has alternate backup elsewhere.

DESCRIPTION OF EMBODIMENTS

Figure 1:
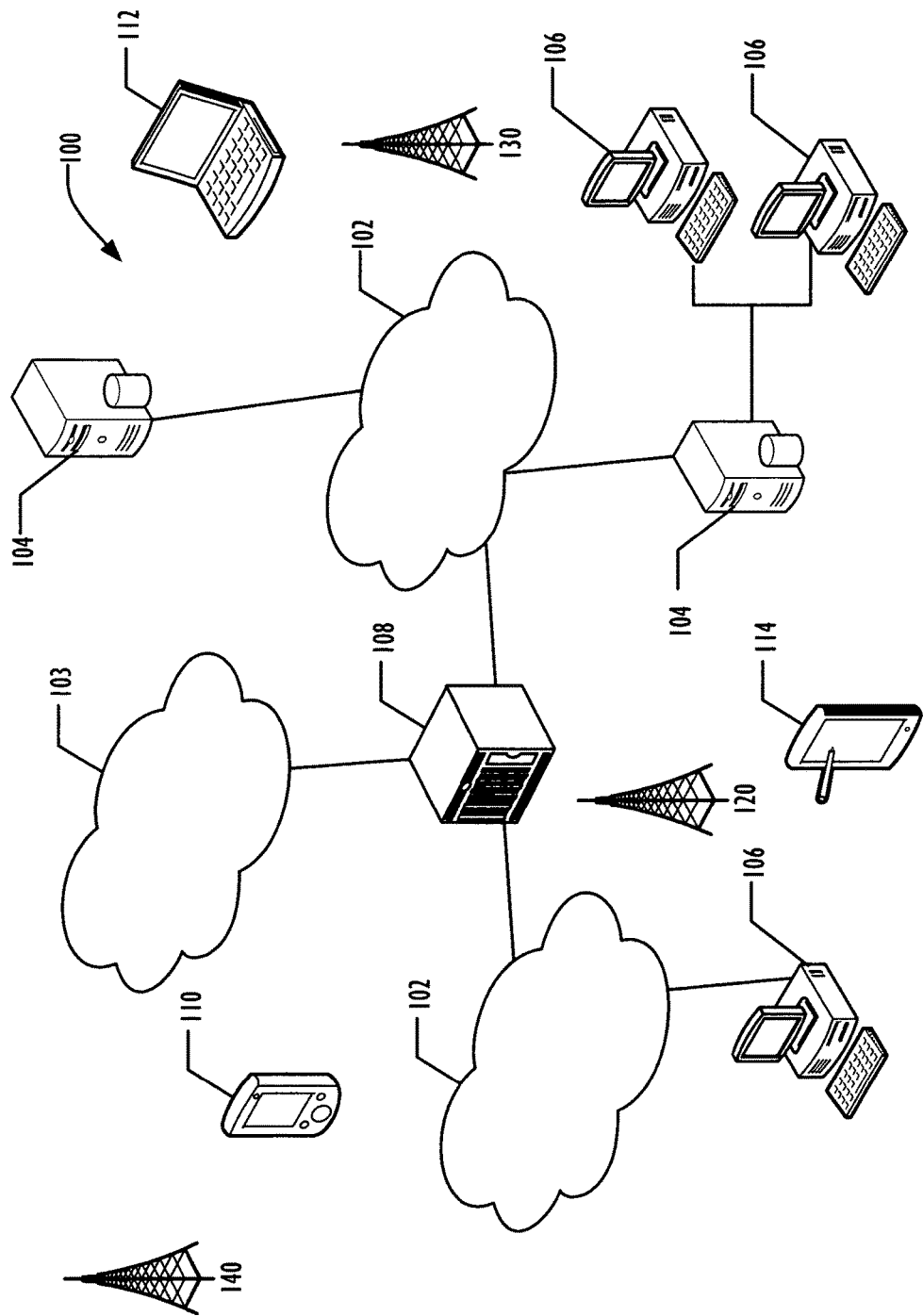
FIG. 1 is a diagram illustrating a network of programmable devices according to one or more embodiments.

In one or more embodiments, the disclosure provides a mechanism to backup a "personal cloud" data residing on any device/service, onto any device/service, using any user device while providing the user full control over the encryption of the data. Moreover, the backup scheme reduces the attack surface and reduces the reliance on a single cloud storage provider. In one or more embodiments, a unified view of all of a user's "personal cloud" accessible from any device. The source of the backup file can be any device or cloud service, and the destination of the backup could be configured as any set of user devices or cloud storage services.

Distributed backup has a multitude of advantages. Personal cloud data is often scattered across many devices and services. Backup from these is cumbersome and inefficient, often requiring user intervention and manual steps. Cloud storage is a natural choice for backup destination. Unfortunately, each storage service provides a separate app that needs to be installed and set up on each of the devices. Personal data in cloud services provide reliability and archival, but from a user point of view, it is not a backup. That is, if a user deletes a file from a cloud storage service, the file cannot be recovered unless user has alternate backup elsewhere. Note that, backup of data from cloud services is not seamless, requiring manual download/uploads etc. Although cloud storage services have improved in their encryption standards, a user may not trust a single cloud storage service provider for his or her data in terms of privacy & security. Users would prefer to have control over their data. The automatic backup of device data typically uses a sync folder that reflects the data to be backed up to a cloud storage service. The folder increases the attack surface in that, a malware can compromise cloud storage data from a device, even without compromising credentials for the cloud storage itself. A single cloud storage as a backup for user personal cloud would put "all eggs in one basket". Breach of one cloud storage would put all of user data at risk.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "personal cloud" refers to user data footprint across multitude of devices (phones to tablets to PCs) and cloud services.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

Referring to the figures, FIG. 1 an example infrastructure 100 in which embodiments may be implemented is illustrated schematically Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services, which may include providing the application, script, or web content in web pages to a secure enclave module. The functionality of the gateway device may be implemented in any device or combination of devices illustrated in FIG. 1; however, most commonly is implemented in a firewall or intrusion protection system in a gateway or router.

Figure 2:
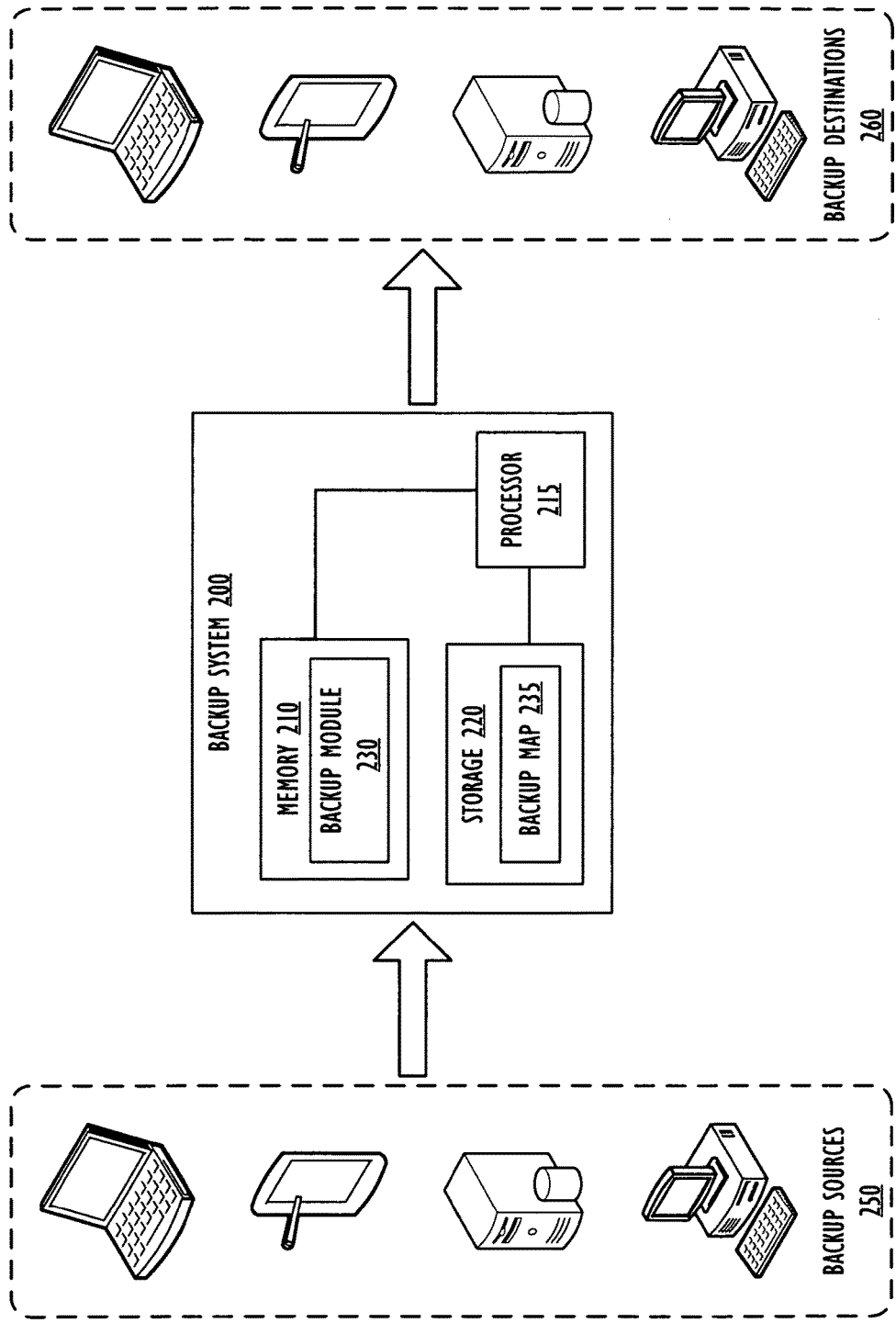
FIG. 2 is a diagram illustrating a system for securely distributing backup data.

FIG. 2 is a diagram illustrating a system for pooling services in a trusted network according to one or more embodiments. As depicted in FIG. 2, the backup system 200 includes a memory 210, a storage 220, and a processor 215. Processor core 215 may be the core for any type of processor, such as a micro-processor, an embedded processor, a digital signal processor (DSP), a network processor, or other device to execute code. Although only one processor core is illustrated in each trusted device in FIG. 2, a processing element may alternatively include more than one of the processor core 215 illustrated in FIG. 2. Processor core 215 may each be a single-threaded core or, for at least one embodiment, processor core 215 may be multithreaded in that it may include more than one hardware thread context (or "logical processor") per core.

Backup System 200 includes a memory 210 coupled to the processor 215. Memory 210 may be any of a wide variety of memories (including various layers of memory hierarchy) as are known or otherwise available to those of skill in the art. Program code, or instructions, such as backup module 230, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 215 follows a program sequence of instructions indicated by the code. In this manner, processor core 215 is transformed during execution of the code.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches.

Briefly, backup module 230 is configured to automatically divide a file to be backed up into data chunks. The file may come from any of various backup sources 250. These data chunks may be of a random size and a random number, depending on a chunking mechanism. A chunking mechanism may be any method or device that produces multiple data chunks from a single file. The data chunks are then encrypted and stored across any of backup destinations 260. Backup destinations may include local devices or remote devices. In one or more embodiments, backup destinations 260 may include storage devices provided by a cloud storage service.

A backup map 235 is encrypted and stored in the backup system 200. In one or more embodiments, a backup map provides instructions for obtaining and rebuilding the file based on the distributed chunks. In one or more embodiments, the backup map may include locations of each of the chunks, and may also include information necessary to obtain the chunks from their respective locations, such as login information for a cloud storage service hosting a chunk, or encryption information for the chunk. In one or more embodiments, the backup map may also include information for how to recombine the chunks to rebuild the file. Although described herein in terms of a backup system, the techniques are not limited to providing backups, but may be used for any file storage purpose.

Figure 3:
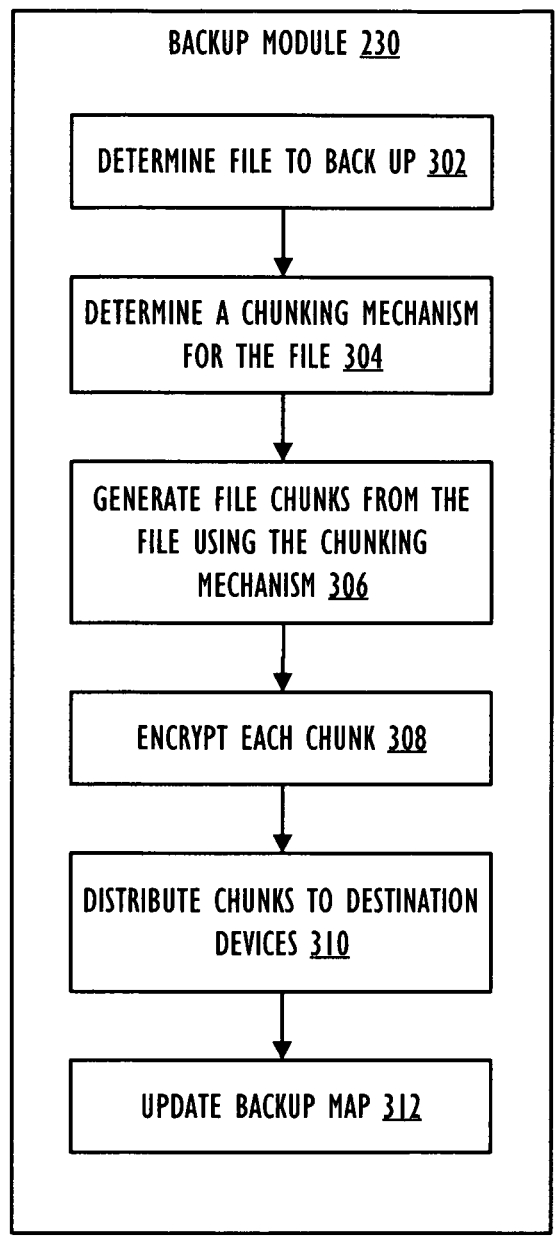
FIG. 3 is a flow diagram illustrating a technique for securely distributing backup data.

FIG. 3 is a flow diagram illustrating a technique for a distributed backup for personal device and cloud data. The various steps are depicted as occurring within backup module 230, however they may be performed by various components of the system. Further, the one or more of the steps may be performed in a different order, or even in parallel.

At 302, the backup module determines a file to back up. In one or more embodiments, the file may be automatically determined based on user access patterns and carried out as an Opportunistic backup. The file may come from a local device, a remote device, a cloud service, or any other storage available to the user, such as those in backup sources 230.

At 304, the backup module determines a chunking mechanism for the file. In one or more embodiments, the chunking mechanism may indicate how to generate data chunks from the file. In one or more embodiments, the chunking mechanism may indicate that the file should be split into chunks of a random size and a random number, for example. In one or more embodiments, the chunking mechanism may dictate other variations of chunk size and number based on any number of factors, such as file type or file size.

At 306, the file is divided into chunks using the chunking mechanism. The chunks may be generated either through contiguous bytes, round robin distribution of consecutive bytes, or using alternate mechanisms. In one or more embodiments, increasing complexity of the chunking mechanism may increase the level of security, but increase the overhead for retrieval. The chosen chunking mechanism could be based on sensitivity of the data. FIG. 4 describes the approaches for chunking.

At 308, the backup module 230 encrypts each chunk. Each chunk may be encrypted using a public key, where the public-private key pair is derived from the platform by a secure execution environment, such as a secure enclave. In one or more embodiments, a pair of public and private keys and a 256 bit AES key may be derived, for example, from the platform by a secure enclave. Each chunk may be encrypted with public key derived from the client, and encrypted chunks are distributed to the user configured destination devices/cloud storage services (S1, . . . , Sm). At 310, the backup module distributes chunks to destination devices. The chunks may be randomly distributed across storage services, including local services, remote services, and cloud services.

At 312, the backup map is updated. In one or more embodiments, the map consists of the relation between chunks and storage services. In one or more embodiments, the backup map may additionally be encrypted using AES-256 bit Key generated by a secure enclave. The backup map may be stored on to the Solution Server, or Backup System. The system may store an encrypted map for each backup file, or the map may be a single data structure with information for multiple distributed files. The backup map provides location of a particular chunk in a particular location, as well as method used for chunking of the particular chunk.

Figure 4A:
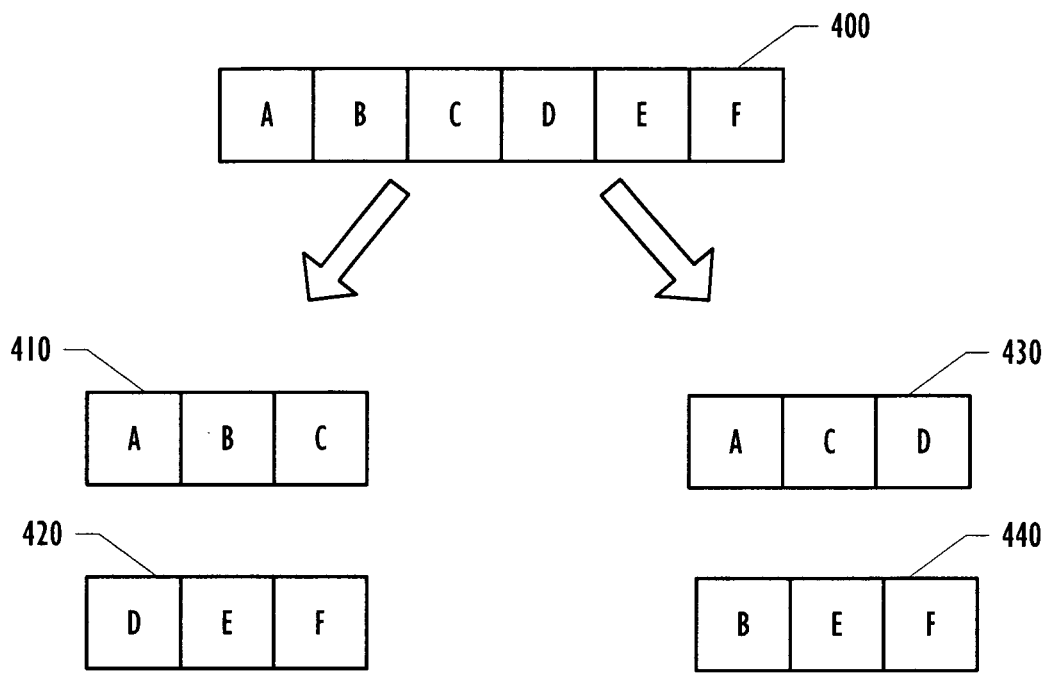
FIG. 4A is a flow diagram illustrating a technique for creating data chunks from a file.

FIG. 4A depicts techniques for generating chunks from a file. In the example, file 400 includes data sets A-F. As depicted, file block 400 may be split into chunks using contiguous bytes, such as chunks 410 and 420. Alternatively, file block 400 may be split into chunks using random bytes, such as chunks 430 and 440. Although not shown, the chunks could also each have a random number of bytes. Thus, the number of bytes in a first chunk of the file block 400 may be different from the number of bytes in a second chunk, or a third chunk.

Figure 4B:
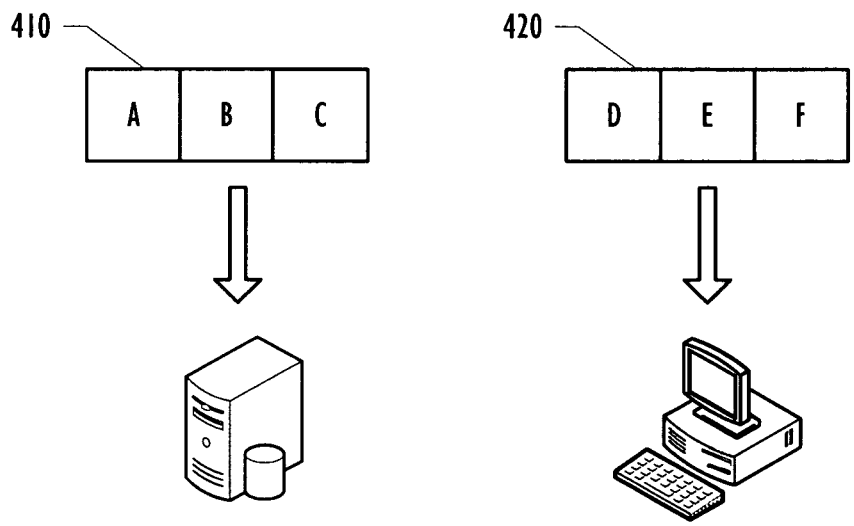
FIG. 4B is a flow diagram illustrating a technique for distributing storage of data chunks from a file.

FIG. 4B depicts the different chunks 410 and 420 of file block 400 stored in distributed locations. Thus, chunk 410 may be stored on a server by a cloud service, whereas chunk 420 may be stored on a local personal computer. The chunking mechanism may be hardened based on available platform capabilities, including dividing the file block into chunks and encrypting the chunks in a secure enclave, generating keys from a platform unique key from enclave primitives, or storing the keys securely in the platform. Additionally, in one or more embodiments, the keys could optionally be encrypted with user password or biometric hash, user epoch, or some such user dependent secret.

Figure 5:
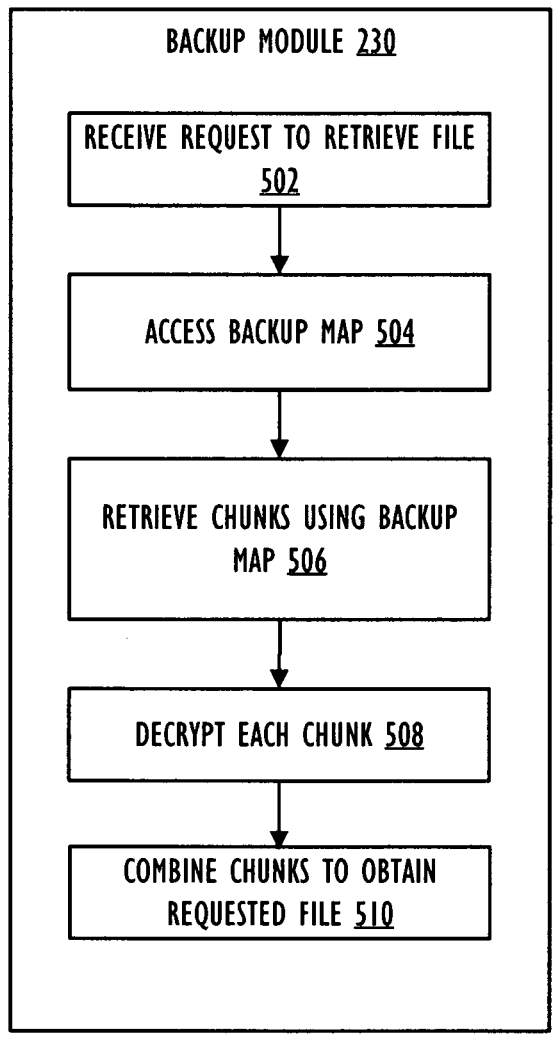
FIG. 5 is a flow diagram illustrating accessing a backup of a file from a distributed backup.

FIG. 5 depicts a flow diagram illustrating a technique for file recovery from a secure distributed backup. At 502, the backup module 230 receives a request to retrieve a particular file. At 504, the backup module accesses the backup map to locate the chunks of the requested file. The map for the file is retrieved from the backup system 200. The map may be encrypted and, thus, is decrypted. In one or more embodiments, the map may be decrypted using the private key derived, for example, using the platform in a secure enclave. At 506, the backup module retrieves chunks using the backup map. The chunks may be accessed through APIs of respective cloud or other storage services. At 508 the chunks are decrypted with client private key. At 510, the decrypted chunks are combined and reassembled based on the chunking mechanism used. The mechanism used may be identified in the backup map, or may be otherwise stored or identified by backup module 230.

Figure 6:
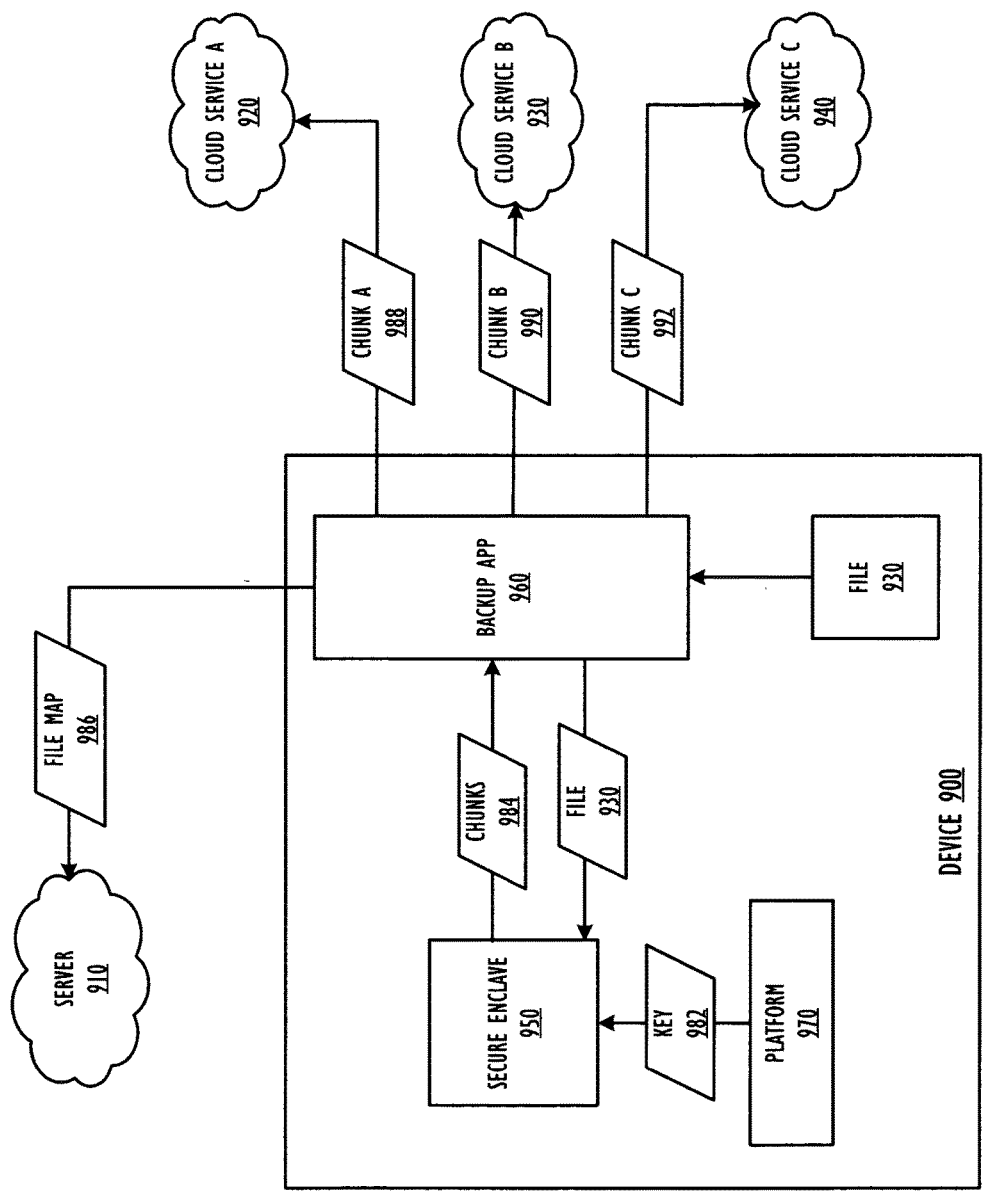
FIG. 6 is a flow diagram illustrating backup creation architecture.

FIG. 6 depicts an overall architecture for creation of a backup file. The backup module, or backup app 960, receives the file 930 for distributed backup. In one or more embodiments, the device 900 may receive the file 930 from a remote source such as a client device. Alternatively, or additionally, the file 930 may be identified locally. The backup app 960 may determine a chunking mechanism for the file. In one or more embodiments, the chunking mechanism may be determined from the secure enclave 950. In one or more embodiments, secure enclave 950 may be a separate hardware module from that which executes the backup application 960. In one or more embodiments, secure enclave 950 may include secure storage. Chunks 984 may be generated from the file 930 using the chunking mechanism, encrypted, and distributed among the example storage locations. In one or more embodiments, the chunks 984 are generated by the secure enclave 950. The chunks 984 may be encrypted, for example, using a key 982 that is generated based on the platform 970. The backup app 960 may then generated a backup map 986 for the backup file, and store the backup map 986 in a server 910. In one or more embodiments, the backup app 986 may be at least partially implemented in hardware, firmware, or software. In one or more embodiments, the server 910 may be a secure network storage. In one or more embodiments, the backup app 960 may alternatively, or additionally, store the file map 986 locally in the device 900. For example, the map may be stored in the secure enclave 950. The backup app 960 may distribute the chunks 988, 990, and 992 among distributed storage devices, such as cloud service A 920, cloud service B 930, and cloud service C 940. In one or more embodiments, if the device 900 is performing the backup operations on behalf of a user device, the backup app 960 may transmit the map to the client device, for example, in response to a request for a file or the map.

Figure 7:
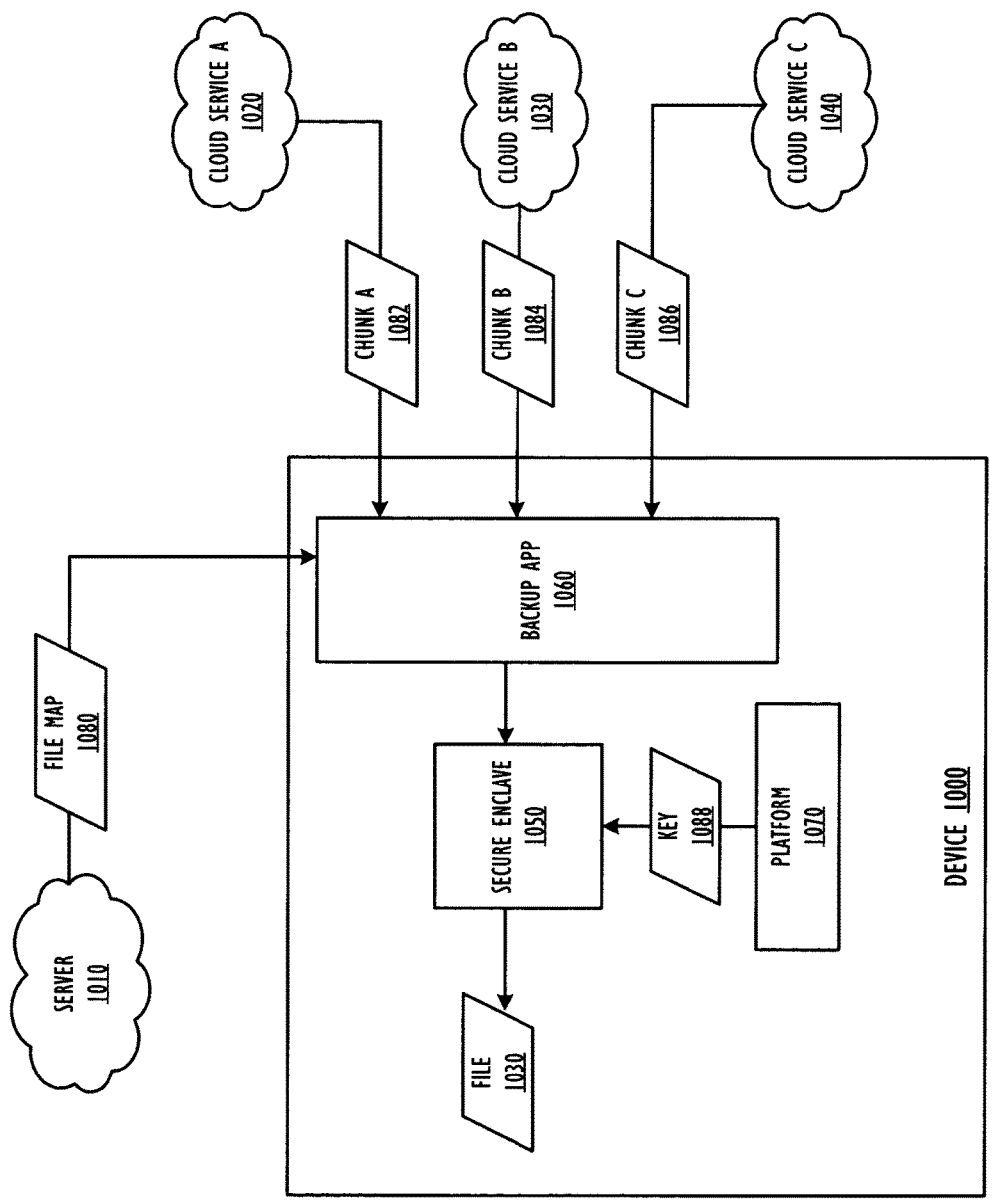
FIG. 7 is a flow diagram illustrating backup retrieval architecture.

FIG. 7 depicts the overall mechanism for retrieval of a distributed backed up file. In one or more embodiments, the backup app 1060, or backup module, receives a request to retrieve a file 1030. In one or more embodiments, the request may be received from a local user, or the request may be received from a remote user device. The backup app 1060 may retrieve the backup map 1080 from the server 1010. In one or more embodiments, the backup app 1060 may be at least partially implemented in hardware, firmware, or software. In one or more embodiment, the backup app 1060 may alternatively retrieve the backup map 1080 from local storage in the user device 1000. The storage may be a secure storage, such as a secure enclave 1050. In one or more embodiments, the backup map 1080 may be encrypted, and the backup app 1060 may decrypt the backup map 1080 using a key 1088. In one or more embodiments, the key 1088 may be generated from the platform 1070. The backup app 1060 may then retrieve the encrypted chunks 1082, 1084, and 1086 from cloud service A 1020, cloud service B 1030, and cloud service C 1040 using the backup map. The encrypted chunks are then decrypted. In one or more embodiments, the encrypted chunks are decrypted by the secure enclave 1050. Then the decrypted chunks are combined to form the requested file. Combining the chunks to form the requested file may be at least partially implemented in hardware. In one or more embodiments, the file may be regenerated by the secure enclave 1050 or the backup app 1060. In one or more embodiments if the request was received from a remote user device, the backup app 1060 may transmit the regenerated file 1030 back to the user device.

Figure 8:
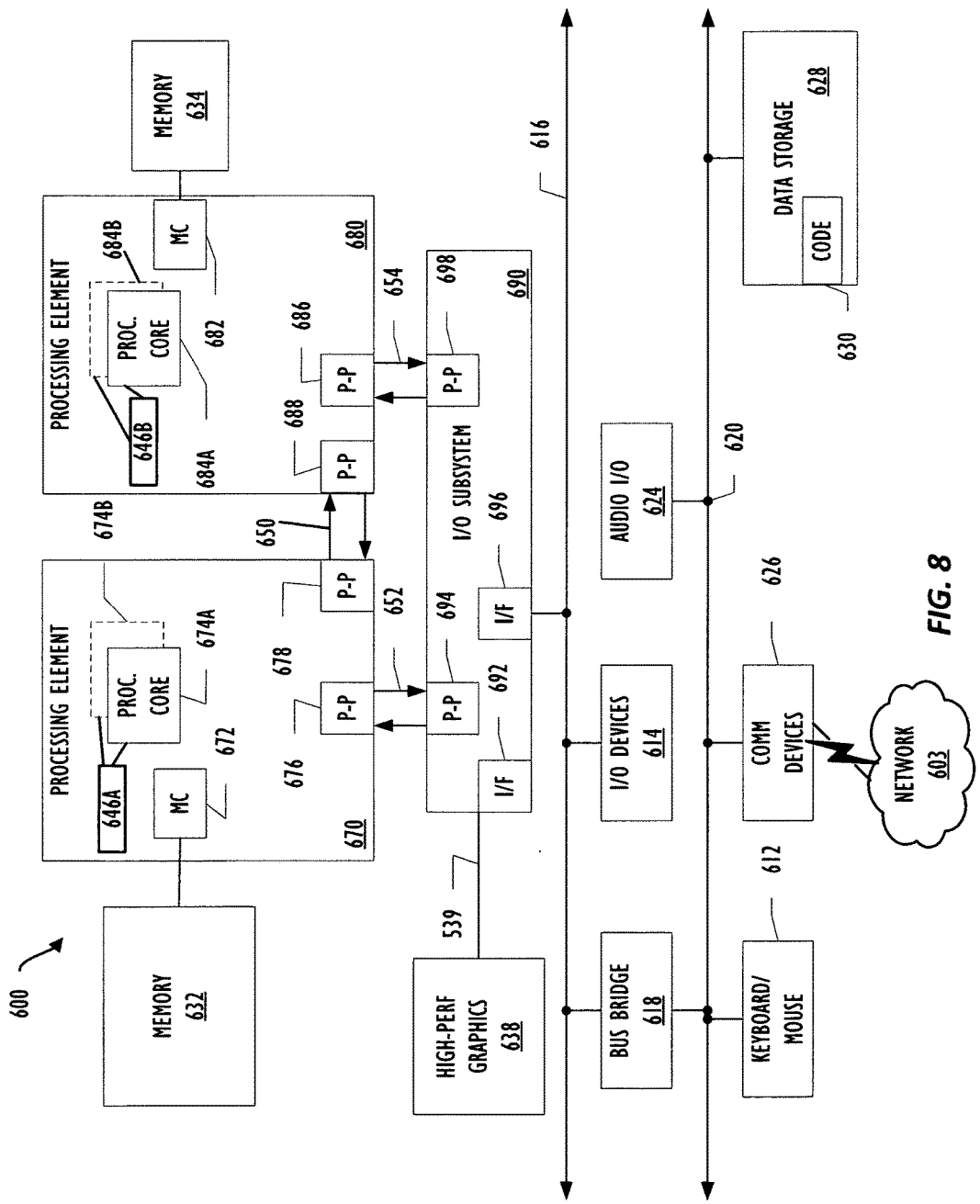
FIG. 8 is a diagram illustrating a computing device for use with techniques described herein according to one embodiment.

Referring now to FIG. 8, a block diagram illustrates a programmable device 600 that may be used within a computing device, such as backup system 200, in accordance with one or more embodiments. The programmable device 600 illustrated in FIG. 8 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 8 may be implemented as a multi-drop bus rather than point-to-point interconnects.

As illustrated in FIG. 8, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-7. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 8 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 8, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 8, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 8, a system may implement a multi-drop bus or another such communication topology. Although links 616 and 620 are illustrated as busses in FIG. 8, any desired type of link may be used. Also, the elements of FIG. 8 may alternatively be partitioned using more or fewer integrated chips than illustrated in FIG. 8.

Figure 9:
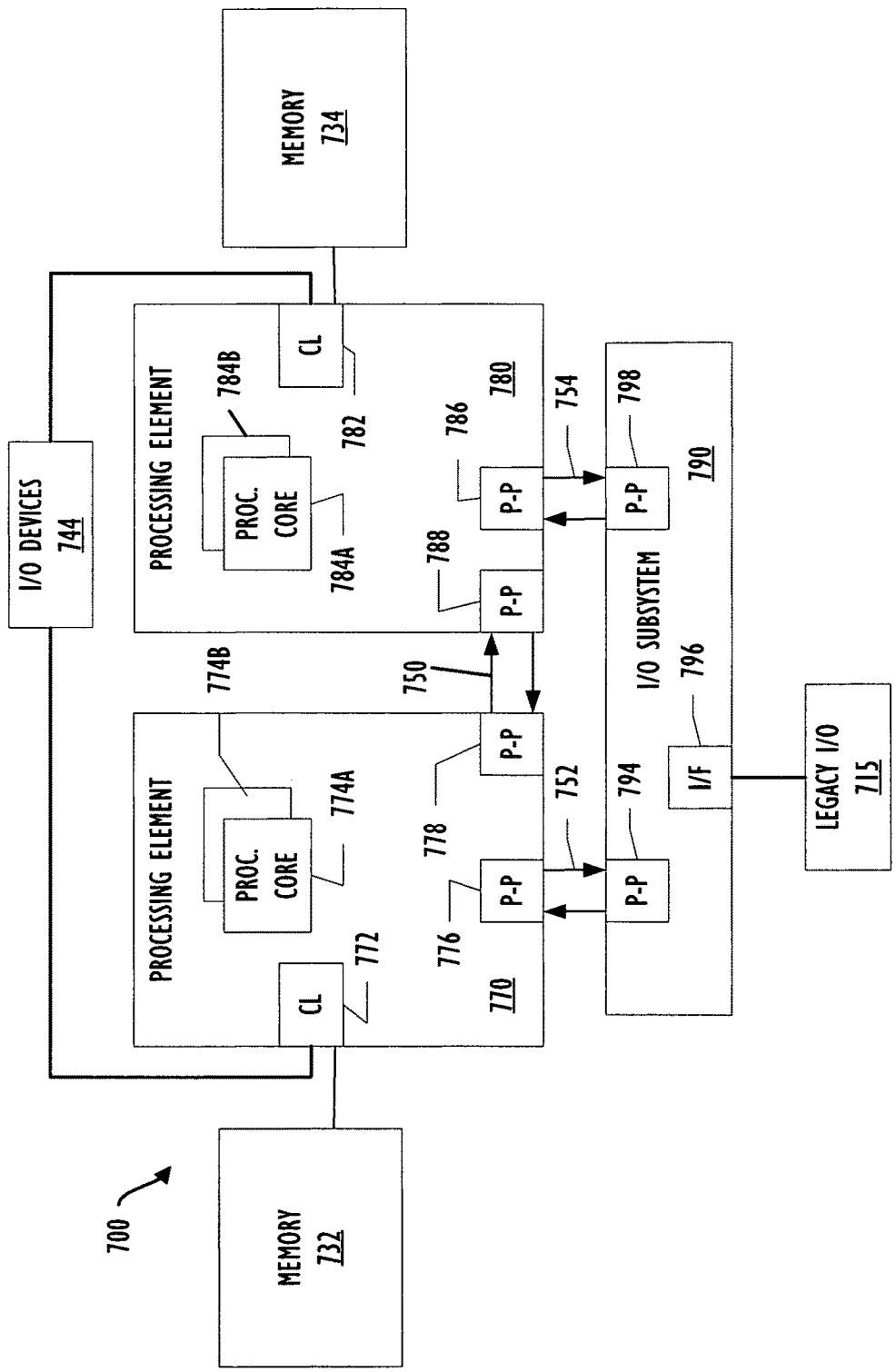
FIG. 9 is a block diagram illustrating a computing device for use with techniques described herein according to another embodiment.

Referring now to FIG. 9, a block diagram illustrates a programmable device 700 according to another embodiment. Certain aspects of FIG. 8 have been omitted from FIG. 9 in order to avoid obscuring other aspects of FIG. 9.

FIG. 9 illustrates that processing elements 770, 780 may include integrated memory and I/O control logic ("CL") 772 and 782, respectively. In some embodiments, the 772, 782 may include memory control logic (MC) such as that described above in connection with FIG. 8. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 9, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 8 and 9 are schematic illustrations of embodiments of programmable devices which may be utilized to implement various embodiments discussed herein. Various components of the programmable devices depicted in FIGS. 8 and 9 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: identify a file to be stored; generate a plurality of file chunks from the file, wherein one or more of the plurality of file chunks are encrypted; transmit, from a first device, each of the plurality of file chunks to one of a plurality of independent storage systems; and generate, at the first device, a map that identifies a storage location for each chunk.

In Example 2 the subject matter of Example 1 optionally includes wherein the plurality of independent storage systems comprise at least one cloud storage service.

In Example 3 the subject matter of Example 1 optionally includes wherein the plurality of independent storage systems comprise a local device.

In Example 4 the subject matter of any of Examples 1-3 optionally includes instructions that when executed cause the machine to store encryption data for each encrypted file chunk in the map.

In Example 5, the subject matter of any of Examples 1-3 optionally includes wherein the plurality of file chunks comprises a first encrypted file chunk and a second encrypted file chunk, wherein the first encrypted file chunk is encrypted by a first encryption method, and wherein the second encrypted file chunk is encrypted by a second encryption method.

In Example 6, the subject matter of any of claims 1-3 optionally includes wherein the plurality of file chunks comprises a first file chunk and a second file chunk, and wherein the first file chunk and the second file chunk are of different sizes.

Example 7 is a system for storing data, comprising: a computer processor; and a storage device coupled to the computer processor comprising instructions which, when executed by the computer processor cause the system to: identify a file to be stored; generate a plurality of file chunks from the file, wherein one or more of the plurality of file chunks are encrypted; transmit, from a first device, each of the plurality of file chunks to one of a plurality of independent storage systems; and generate, at the first device, a map that identifies a storage location for each chunk.

In Example 8 the subject matter of Example 7 optionally includes wherein the plurality of independent storage systems comprise at least one cloud storage service.

In Example 9 the subject matter of Example 7 optionally includes wherein the plurality of independent storage systems comprise a local device.

In Example 10 the subject matter of any of Examples 7-9 optionally include the storage device further comprising instructions that when executed cause a machine to: store encryption data for each encrypted file chunk in the map.

In Example 11, the system of any of Examples 7-9 optionally include wherein the plurality of file chunks comprises a first encrypted file chunk and a second encrypted file chunk, wherein the first encrypted file chunk is encrypted by a first encryption method, and wherein the second encrypted file chunk is encrypted by a second encryption method.

In Example 12, the system of any of Examples 7-9 optionally include wherein the plurality of file chunks comprises a first file chunk and a second file chunk, and wherein the first file chunk and the second file chunk are of different sizes.

Example 13 is a method for storing data, comprising: identifying a file to be stored; generating a plurality of file chunks from the file, wherein one or more of the plurality of file chunks are encrypted; transmitting, from a first device, each of the plurality of file chunks to one of a plurality of independent storage systems; and generating, at the first device, a map that identifies a storage location for each chunk.

In Example 14 the subject matter of Example 13 optionally include wherein the plurality of independent storage systems comprise at least one cloud storage service.

In Example 15 the subject matter of Example 13 optionally includes wherein the plurality of independent storage systems comprise a local device.

In Example 16 the subject matter of any of Examples 13-15, optionally include storing encryption data for each encrypted file chunk in the map.

In Example 17, the subject matter of any of Examples 13-15, optionally include wherein the plurality of file chunks comprises a first encrypted file chunk and a second encrypted file chunk, wherein the first encrypted file chunk is encrypted by a first encryption method, and wherein the second encrypted file chunk is encrypted by a second encryption method.

In Example 18, the subject matter of any of Examples 13-15, optionally include wherein the plurality of file chunks comprises a first file chunk and a second file chunk, and wherein the first file chunk and the second file chunk are of different sizes.

Example 19 is a machine readable medium on which instructions are stored, comprising instructions that when executed cause a machine to: receive a request to retrieve a file; obtain a map corresponding to the file, wherein the map identifies a plurality of independent storage systems corresponding to each of a plurality of file chunks of the file; retrieve the plurality of file chunks from the identified plurality of independent storage systems; determine that at least one of the plurality of file chunks is an encrypted file chunk; decrypt the encrypted file chunk; and generate the requested file by combining the plurality of file chunks.

In Example 20 the subject matter of Example 19 optionally includes wherein at least one of the plurality of independent storage systems is a cloud storage service.

In Example 21 the subject matter of Example 19 optionally includes wherein at least one of the plurality of independent storage systems is a local device.

In Example 22 the subject matter of Example 19 optionally includes wherein the instructions that when executed cause the machine to generate the file comprise instructions that when executed cause the machine to: identify a chunking mechanism in the map; and generate the file from the plurality of file chunks based on the chunking mechanism.

In Example 23 the subject matter of any of Examples 19-21 optionally include wherein the plurality of file chunks comprises at least a first chunk and a second chunk of different sizes.

In Example 24, the subject matter of any of Examples 19-21, wherein the plurality of file chunks comprises a first encrypted file chunk and a second encrypted file chunk, wherein the first encrypted file chunk is encrypted by a first encryption method, and wherein the second encrypted file chunk is encrypted by a second encryption method.

In Example 25, the subject matter of Example 19 optionally includes wherein the instructions that when executed cause the machine to generate the file comprise instructions that when executed cause the machine to: identify a chunking mechanism in the map; and generate the file from the plurality of file chunks based on the chunking mechanism.

Example 26 is a machine readable medium including code, when executed, to cause a machine to perform the methods of Examples 13-18.

Example 27 is a system comprising: a processor; and a memory on which instructions are stored, comprising instructions that when executed by the processor cause the system to: receive a request to retrieve a file; obtain a map corresponding to the file, wherein the map identifies a plurality of independent storage systems corresponding to each of a plurality of file chunks of the file; retrieve the plurality of file chunks from the identified plurality of independent storage systems; determine that at least one of the plurality of file chunks is an encrypted file chunk; decrypt the encrypted file chunk; and generate the requested file by combining the plurality of file chunks.

In Example 28 the subject matter of Example 27 optionally includes wherein at least one of the plurality of independent storage systems is a cloud storage service.

In Example 29 the subject matter of Example 27 optionally includes wherein at least one of the plurality of independent storage systems is a local device.

In Example 30 the subject matter of Example 27 optionally includes wherein the instructions to decrypt the encrypted file chunk further comprises instructions that when executed cause the machine to: retrieve encryption information for the encrypted file chunk from the map; and decrypt the encrypted file chunk using the encryption information.

In Example 31 the subject matter of Example 27 optionally includes wherein the plurality of file chunks comprises at least a first chunk and a second chunk of different sizes.

In Example 32 the subject matter of Example 27 optionally includes wherein the plurality of file chunks comprises a first encrypted file chunk and a second encrypted file chunk, wherein the first encrypted file chunk is encrypted by a first encryption method, and wherein the second encrypted file chunk is encrypted by a second encryption method.

In Example 33 the subject matter of Example 27 optionally includes wherein the instructions that when executed cause the machine to generate the file comprise instructions that when executed cause the machine to: identify a chunking mechanism in the map; and generate the file from the plurality of file chunks based on the chunking mechanism.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage device or storage disk comprising instructions which, when executed, cause a first device to at least:
generate a first file chunk and a second file chunk from a file in response to a request from a client device to store the file remotely from the client device,
encrypt the first file chunk by a first encryption method;
encrypt the second file chunk by a second encryption method different than the first encryption method;
transmit the first file chunk to a first storage system of a first cloud storage service;
transmit the second file chunk to a second storage system of a second cloud storage service; and
generate a map that (A) identifies a first storage location of the first file chunk and a second storage location of the second file chunk, (B) first encryption information corresponding to the first encryption method and second encryption information corresponding to the second encryption method, and (C) includes first login information to access the first cloud storage service and second login information to access the second cloud storage service; and
transmit the map to a remote device different from the first device and the client device.

2. The storage device or storage disk of claim 1, wherein the first device includes a secure memory.

3. The storage device or storage disk of claim 1, wherein at least one of the first storage system and the second storage system further include a local device.

4. The storage device or storage disk of claim 1, wherein the first file chunk and the second file chunk have randomly determined sizes.

5. The storage device of claim 1, wherein the remote device is one of the first storage system or the second storage system.

6. A system comprising:
a processor;
a network interface communicatively coupled to the processor;
hardware circuitry communicatively coupled to the processor;
and
a storage device communicatively coupled to the processor, the hardware circuitry, and the network interface, the storage device including instructions which, when executed, cause the processor to:
in response to a request from a client device to store a file remotely from the client device, cause the hardware circuitry to generate a first file chunk and a second file chunk from the file;
encrypt the first file chunk by a first encryption method;
encrypt the second file chunk by a second encryption method different than the first encryption method;
transmit, via the network interface, the first file chunk to a first storage system of a first cloud storage service;
transmit, via the network interface, the second file chunk to a second storage system of a second cloud storage service;
generate a map that (A) identifies a first storage location of the first file chunk and a second storage location of the second file chunk, (B) includes first encryption information corresponding to the first encryption method and second encryption information corresponding to the second encryption method, and (C) includes first login information to access the first cloud storage service and second login information to access the second cloud storage service; and
transmit, via the network interface, the map to a remote device different from the client device.

7. The system of claim 6, wherein the hardware circuitry includes a secure enclave.

8. The system of claim 6, wherein at least one of the first storage system or the second storage system includes a local device.

9. The system of claim 6, wherein the instructions, when executed, cause the processor to include rebuild information about how to rebuild the file from the encrypted first and second file chunks in the map.

10. The system of claim 6, wherein the first file chunk and the second file chunk have randomly determined sizes.

11. A method comprising:
generating, with hardware circuitry on a local device, a first file chunk and a second file chunk from a file in response to a request from a client device to store the file remotely from the client device;
encrypting, via the hardware circuitry, the first file chunk using a first encryption method;
encrypting via the hardware circuitry, the second file chunk using a second encryption method different than the first encryption method;
transmitting, from the local device, the first file chunk to a first storage system of a first cloud storage service;
transmitting, from the local device, the second file chunk to a second storage system of a second cloud storage service; and
generating, at the local device, a map that (A) identifies a first storage location of the first file chunk and a second storage location of the second file chunk, (B) includes first encryption information corresponding to the first encryption method and second encryption information corresponding to the second encryption method, and (C) includes first login information to access the first cloud storage service and second login information to access the second cloud storage service; and
transmitting the map to a remote device different from the local device and the client device.

12. The method of claim 11, further including:
receiving a request for the file from the client device;
obtaining the map corresponding to the file from the remote device;
retrieving the first file chunk from the first storage system and the second file chunk from the second storage system using information from the map;
determining that at least one of the first file chunk or the second file chunk is an encrypted file chunk;
decrypting the at least one of the first file chunk or the second file chunk;
generating the requested file by combining the first file chunk and the second file chunk; and
transmitting the requested file to the client device.

13. The method of claim 11, wherein the hardware circuitry includes a secure storage.

14. The method of claim 11, wherein the first file chunk and the second file chunk have randomly determined sizes.

15. The method of claim 11 , wherein the map further includes rebuild information for how to recombine the first file chunk and the second file chunk to rebuild the file.

* * * * *

UNITED STATES PATENT AND TRADEMARK OFFICE
CERTIFICATE OF CORRECTION

PATENT NO. : 10,198,589 B2
APPLICATION NO. : 14/757701
DATED : February 5, 2019
INVENTOR(S) : Kumar et al.

Page 1 of 1

It is certified that error appears in the above-identified patent and that said Letters Patent is hereby corrected as shown below:

In the Claims

Column 12, Line 10 (Claim 1): after "(B)" insert --includes--

Signed and Sealed this
Third Day of September, 2019

Andrei Iancu
*Director of the United States Patent and Trademark Office*